(12) United States Patent
Swartz et al.

(10) Patent No.: US 6,687,345 B1
(45) Date of Patent: Feb. 3, 2004

(54) WIRELESS TELEPHONE FOR ACQUIRING DATA ENCODED IN BAR CODE INDICIA

(75) Inventors: Jerome Swartz, Old Field, NY (US); Ron Goldman, Westbury, NY (US); Thomas Roslak, Eastport, NY (US); Gary Serbin, Bellmore, NY (US); Anthony R. Barkume, Manorville, NY (US); Miklos Stern, Flushing, NY (US); Jay P. White, Bohemia, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/571,618

(22) Filed: May 15, 2000

Related U.S. Application Data

(63) Continuation of application No. 09/240,399, filed on Jan. 29, 1999, now Pat. No. 6,243,447, which is a division of application No. 08/654,961, filed on May 29, 1996, now Pat. No. 5,923,735, which is a continuation-in-part of application No. 08/440,089, filed on May 12, 1995, now abandoned, which is a continuation-in-part of application No. 08/111,531, filed on Aug. 25, 1993, now abandoned.

(51) Int. Cl.⁷ .............................................. H04M 1/02
(52) U.S. Cl. ............................. 379/93.12; 379/110.01
(58) Field of Search .................... 379/90.01, 93.12, 379/100.02, 110.01, 910; 455/403, 412, 414, 555, 557; 235/375, 378, 385, 454; 395/201, 216, 226, 227; 239/472.01, 472.02

(56) References Cited

U.S. PATENT DOCUMENTS

| | | | |
|---|---|---|---|
| 4,355,372 A | 10/1982 | Johnson et al. | 364/900 |
| 4,481,382 A | 11/1984 | Villa-Real | 179/2 EA |
| 4,503,288 A | 3/1985 | Kessler | 179/2 DP |
| 4,508,935 A | 4/1985 | Mastromoro | 179/2 EA |
| 4,654,482 A | 3/1987 | DeAngelis | 379/95 |
| 4,661,659 A | 4/1987 | Nishimura | 379/61 |

(List continued on next page.)

FOREIGN PATENT DOCUMENTS

| | | | |
|---|---|---|---|
| DE | 30 11 511 | 10/1981 | |
| DE | 3741788 | 6/1989 | H04M/11/06 |
| DE | 3814728 | 11/1989 | H04Q/7/04 |
| GB | 2 169 475 | 7/1986 | 379/357 |
| GB | 2235077 A * | 2/1991 | G08C/23/00 |
| GB | 2 246 491 | 1/1992 | 379/357 |
| JP | 61-100061 | 5/1986 | 379/357 |
| JP | 63-172558 | 7/1988 | 379/357 |
| JP | 63-275250 | 11/1988 | 379/433 |
| JP | 01-042967 | 2/1989 | 379/357 |
| JP | 05050738 | 2/1993 | B41M/3/00 |
| WO | WO9219064 | 10/1992 | H04M/3/50 |

OTHER PUBLICATIONS

"The Springville Herald"—"John Barrus Wins $10,000 Entrepreneurial Competition", Jul. 31, 1991, p. 3.
"The Boston Globe"—"MIT Sparks Entrepreneurial Spirit"—Apr. 27, 1992 p. 23.
Kate A. Kane, "Road Warriors Freedom to Roam," p. 58, Apr./May 1996 "Fast Company".
"Motorola Introduces Integrated Pager and Cellular Telephone," "Law Technology"—May 1996.

*Primary Examiner*—Scott L. Weaver
(74) *Attorney, Agent, or Firm*—Mitchell S. Feller; Clifford Chance US LLP

(57) ABSTRACT

A system for transferring data between a centrally located site and a portable communications terminal via a telephone network, the site having associated therewith a look up table containing-plurality of data records correlating to items disposed at a retail establishment, wherein each of the items has associated therewith a bar code encoded with the indicia unique to each item, with each of the bar coded indicia corresponding to a particular record in the table, the data containing at least a portion of said record.

7 Claims, 11 Drawing Sheets

U.S. PATENT DOCUMENTS

| | | | |
|---|---|---|---|
| 4,697,281 A | 9/1987 | O'Sullivan | 379/59 |
| 4,706,273 A | 11/1987 | Spear et al. | 379/58 |
| 4,734,858 A | 3/1988 | Schlafly | 364/408 |
| 4,837,800 A | 6/1989 | Freeburg et al. | 379/59 |
| 4,850,009 A | 7/1989 | Zook et al. | 379/96 |
| 4,887,265 A | 12/1989 | Felix | 370/94.1 |
| 4,897,865 A | 1/1990 | Canuel | 379/91 |
| 4,907,264 A | 3/1990 | Seiler et al. | 379/355 |
| 4,937,853 A | 6/1990 | Brule et al. | 379/96 |
| 4,947,028 A | 8/1990 | Gorog | 235/381 |
| 4,975,948 A | 12/1990 | Andresen et al. | 379/355 |
| 5,015,833 A | 5/1991 | Shepard et al. | 235/472 |
| 5,021,641 A | 6/1991 | Swartz et al. | 235/467 |
| 5,189,287 A | 2/1993 | Parienti | 235/375 |
| 5,288,976 A | 2/1994 | Citron et al. | 235/375 |
| 5,301,222 A | 4/1994 | Fujiwara | 379/58 |
| 5,335,276 A | 8/1994 | Thompson et al. | 380/21 |
| 5,369,700 A | 11/1994 | Koura et al. | 379/387 |
| 5,382,779 A | 1/1995 | Gupta | 235/383 |
| 5,414,251 A | 5/1995 | Durbin | 235/462 |
| 5,424,524 A | 6/1995 | Ruppert et al. | 235/462 |
| 5,465,291 A | 11/1995 | Barrus et al. | 379/67 |
| 5,468,948 A | 11/1995 | Koenck et al. | 235/472 |
| 5,468,952 A | 11/1995 | Alexander et al. | 235/492 |
| 5,487,099 A | 1/1996 | Maekawa | 379/59 |
| 5,487,161 A | 1/1996 | Koenck et al. | 379/442 |
| 5,640,002 A * | 6/1997 | Ruppert et al. | 235/462.46 |
| 6,058,304 A * | 5/2000 | Callaghan et al. | 455/422 |
| 6,105,871 A * | 8/2000 | Campo et al. | 235/472.01 |
| 6,138,914 A * | 10/2000 | Campo et al. | 235/472.01 |

\* cited by examiner

WIRELESS TELEPHONE FOR ACQUIRING DATA ENCODED IN BAR CODE INDICIA

CROSS-REFERENCE TO RELATED APPLICATION

This application is a continuation of application Ser. No. 09/240,399 filed Jan. 29, 1999, now U.S. Pat. No. 6,243,447, which is a division of application Ser. No. 08/654,961, filed May 29, 1996 and now U.S. Pat. No. 5,923,735, which is a continuation-in-part of U.S. patent application Ser. No. 08/440,089, filed May 12, 1995, now abandoned, which is a continuation-in-part of U.S. patent application Ser. No. 08/111,531, filed Aug. 25, 1993, now abandoned. All the specifications of the above listed applications are incorporated by reference herein.

BACKGROUND OF THE INVENTION

Retail establishments are trying to become more efficient by applying different and innovative operating methods that help to increase their business's financial condition. One of the constantly pursued goals is the reduction of a customer's waiting time in a checkout line. Being able to speed up the flow of customers through a check-out station, or to reduce cost of a checkout transaction, is critical to the success of a retail business. An evolution of the store checkout process has caused replacement of manual price keying of each item being purchased, for the process of scanning the item. Today, the bar code readers are commonly used in commercial and retail environments. In a retail checkout transaction the consumer has to present all the items he(she) wants to purchase to the cashier at a checkout register. The cashier scans each item in the order in which it is presented to him. In addition, there may be an ID check if the customer is purchasing a restricted item, such as, but not limited to, alcohol or tobacco. The transaction is completed once all the items have been scanned, all the coupons have been accepted, the total costs have been calculated, and the consumer has paid for the items. Even though scanning all the items at a checkout register takes less time than manually entering each item description into the computer, the sequential presentation to a cashier of each individual purchase can still take a long time and create long lines of customers waiting to pay for their purchases. This can cause bottlenecks at the checkout stations, reduce throughput, make customers unhappy, and affect the financial condition of a retail establishment. Self-service checkout, or "self-checkout" is a new way of conducting a checkout transaction and is a rapidly growing application in the retail environment. In a self-checkout system, each customer, rather than the cashier, scans the bar codes on the items he is purchasing. Presently there exist two types of self-checkout systems.

In the first type of self-checkout system, scanning takes place at a checkout station. After selecting all the shopping items, a customer brings all the items to a checkout station. A checkout station comprises a scanner for reading the product bar codes and coupons, a weighing scale for verifying purchased item price, and a checkout terminal for generating the final bill and accepting payment. Once at the checkout station, the customer scans the bar codes on his purchases, instead of having a cashier scan his items. After all the purchases have been scanned and verified, the customer also scans any coupons he might have. The customer requests the final bill by selecting an appropriate button on the checkout terminal. In response to the customer's request, the total purchase price is displayed on the terminal screen and the bill is printed out. The customer tenders payment to the checkout terminal. The terminal can accept payments by any standard payment methods. Once the bill has been paid and the receipt has been issued, the self-checkout transaction is finished and the customer can leave the store.

This system has inherent problems. Even though the system reduces labor costs by not having the cashier scan each item at the checkout register, it does not reduce customer's checkout time. In fact, the system usually increases the time to checkout, because the consumers are not as experienced at scanning the products as the cashiers. Also, because product scanning does not take place until the customer completes his shopping item selection, the system does not provide the customer with the real-time item price information or the real-time total purchase price information. This lack of cost information during item selection affects consumer's shopping efficiency. Consumers may either underspend and not purchase all the needed items, or overspend and have to return some of the purchased products.

The second type of self-checkout system consists of a rack with portable scanning terminals. Price information for each item in the store is downloaded from the store's computer into the terminal's memory during a time when the system usage is low or the system is non-operational. Each customer receives one scanning terminal upon placing their ID or shopper loyalty card into a card reader (e.g., magnetic stripe reader or bar code reader) in the rack at the log-in station. While shopping, the customer uses the terminal to scan bar codes associated with his purchases. The terminal has two scan trigger keys: the plus trigger key and the minus trigger key. Each trigger enables the scanning module located inside the terminal. When the consumer wishes to add a product to the group of items he wants to purchase, he uses the add trigger key to scan the product bar code. This process adds the item to the consumer's purchased item list inside the terminal's memory. In case the customer decides to return one of the items previously added to the purchased item list, he scans the item bar code using the minus trigger key. This process deletes the product from the customer's purchase item list inside the terminal's memory. In each case the information regarding the scanned item is displayed on the terminal screen. This information may include the price of the returned item as well as the quantity of the item on the customer's buy list. The terminal also has a total key, which is used to display customer's total transaction costs based upon the prices stored in the terminal's memory. When the item selection has been completed, the customer places the scanning terminal back into the rack. The customer's shopping information, which has been stored in the scanning terminal's memory, is downloaded through the terminal rack to the store computer, where the customer's transaction file is created. A ticket having a bar code printed thereon, wherein the bar code is encoded with the address of the customer's transaction file inside the store computer, gets issued to the customer. The customer takes the ticket and proceeds to a checkout register. When the cashier scans the bar coded ticket, the transaction file is retrieved from the store computer. The store computer also determines the security verification measures that the customer will have to undergo at a checkout station. Those measures are determined based upon random probability function conditioned by the customer's scanning accuracy during the past self-checkout transactions and the content of the present transaction. In certain cases all of the customer's purchases may have to be re-scanned. After completion of the required security checks and acceptance of any coupons the customer might have, the final bill is calculated. The customer settles the bill by any standard payment method and leaves the store.

Although this approach offers many advantages over the previously described system, it still presents a few problems. There must be one scanning terminal available per each potential customer. The costs of investing in a large number of scanning terminals and in a number of terminal racks may be prohibitive for most retail establishments. Because the scanning terminal has a fixed amount of memory, the size of information that can be stored inside the terminal is limited. Also, the price information displayed after scanning each item may not be synchronized to the point of sale system database, because the product price might have changed from the time when it was downloaded into the terminal to the time when the product bar code was scanned. In addition, the customer must leave the scanning terminal at the store and can not take it home for personal use.

SUMMARY OF THE INVENTION

This invention relates to a new self-checkout system for a retail shopping environment. The system is comprised of a plurality of portable communications terminals, a store's host computer, and a plurality of store checkout stations. Each portable communications terminal is owned or leased by the consumer using it, or made available to the consumer by the telephone network service provider. Unlike the self-checkout systems described above, the use of the new self-checkout system allows the consumers to take the device with them when they leave a store. Because a consumer can take the terminal home, he may use it for personal transactions to be described herein. The portable communications terminal has a bar code reading module and a telephone module. It may be used as cellular telephone, a modem, or as a personal hand-held scanning terminal. When using the device as a personal hand-held scanning terminal, the consumers may scan coupons or other bar coded materials and thereby make their own shopping lists. Also, a terminal resident software program may create a "predicted shopping list" based upon the customer's historical shopping profile and scanned item lists. A consumer may later retrieve these lists and use them during shopping.

The proposed self-checkout system works as follows. A consumer, upon entering a retail store, establishes a cellular communication channel between his portable communications terminal and the store's host computer. While shopping, the customer scans each product he wants to purchase. The bar code information of the scanned item is transmitted to the store computer via the established communication channel. The store computer, upon receipt of the bar code information, updates the customer's transaction file and sends product information, product price, and customer's subtotal amount spent, back to the terminal. Because the data transmitted by the store computer represents the latest product information and it is received by the terminal in real-time, the information presented to the customer is more accurate and complete. The customer proceeds to a checkout register after the item selection has been finished. A cashier at the checkout register, rather than scanning every item, retrieves the customer's transaction file from the store computer into the register. The transaction file retrieval request may be accomplished by scanning the customer's ID. The retrieved transaction file contains, but is not limited to, individual product information, subtotal price, and required security measures. After successful security verification of the purchased items and acceptance of any coupons the customer might have, the final bill is calculated. After paying the bill, the customer terminates the communication channel between the portable communications terminal and the store computer. At this point the self-checkout transaction has been completed. Because there may be many customers shopping in a store at the same time, the system is able to carry on a number of self-checkout transactions simultaneously, without affecting a consumer's transaction time.

Not having the cashier scan each purchased item reduces the amount of checkout time. Because the portable communications terminal is kept by the consumer, it is expected that he will take better care of the it, then if the terminal were owned by the store. This will reduce repair costs as well as the store's capital expenditures.

Unlike the previous self-checkout systems, the invention provides benefits to both, the consumer and the retail establishment. The consumer gets accurate real-time product information about his purchases and reduces his store checkout time. The store increases its customer flow, retains satisfied customers, and significantly reduces its capital and operating expenses. The store's capital and operating expenses may be reduced even further by sharing some of the costs with the telephone network provider.

Because the store computer can keep track of all the scanned products that were selected or placed back on the shelves, marketing specialists could use this information to evaluate consumer preferences and market trends, as well as track inventory.

BRIEF DESCRIPTION OF THE DRAWINGS

The invention will be described in detail with reference to the following drawings in which like reference numerals refer to like elements within.

DETAILED DESCRIPTION OF THE PREFERRED EMBODIMENT.

Figure 1:
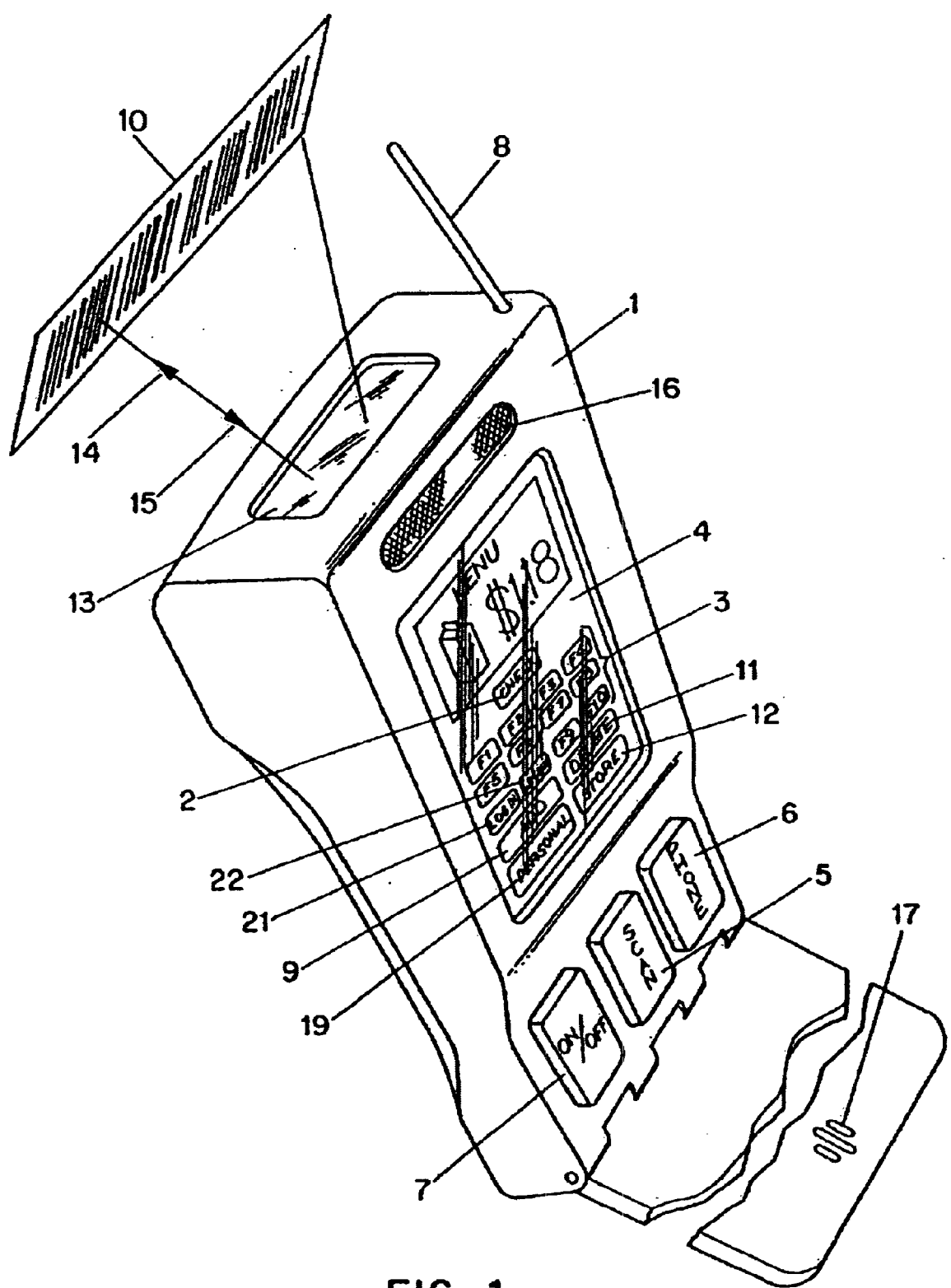
FIG. 1 illustrates a portable communications terminal, in accordance with the preferred embodiment of the present invention.

FIG. 1 illustrates the portable communications terminal 1 in accordance with the invention (various minor components of the portable communications terminal have been omitted for simplicity). The terminal is one of the elements of the invented self-checkout system. Power to the device is controlled by an on/off toggle key 7. As used herein, the term "key" represents a physical push key which can be activated either manually or mechanically. Also, as used herein, the term "button" represents a touch sensitive, software programmable area of the touch screen display. The on/off key may be activated manually or by using a phone flip cover. The on/off key 7 powers up the portable communications terminal 1 when the terminal is in the off state, and powers down the device 1 when it is in the on state. There are two basic operating modes: a phone mode and a scan mode. When operating in the cellular phone mode, the portable communications terminal 1 is designed to operate as a cellular phone in accordance with the cell phones well known in the art. (Refer to U.S. Pat. Nos. 4,697,281, 4,837,800, 4,887,265). The scan mode is subdivided into a personal scan mode described with reference to FIG. 4 and a store scan mode described with reference to FIG. 5. Store scan mode is the mode used during the self-checkout transaction.

At power-up, the device wakes up in either the phone mode or the personal scan mode. The phone key 6 places the portable communications terminal 1 into the cellular phone operating mode. The scan key 5 turns on the scan mode and allows the portable communications terminal 1 to operate as a bar code scanning terminal. Bar code scanners and scanning terminals are well known in the art. (Refer to U.S. Pat. Nos. 4,850,009, 5,015,833, 5,021,641, 5,414,251).

A touch screen 4, a speaker 16 and a microphone 17, provide visual, tactile and audio operator feedback. The microphone 17 converts acoustical voice signals into electrical signals. It is used heavily during the phone operation, but may also be utilized by a user to send voice commands to the device during scan mode operation.

Speaker 16 converts electrical signals into acoustical signals that are sent to an operator. It is used heavily during the phone mode operation, but could also be used to send the system status, via recorded messages, beeps, or music, to the user during scan mode operation.

The touch screen 4 displays information and system status, and allows the user to select different system options. Depending on the operating mode, the touch screen displays different software menus 18. In addition, the touch screen 4 displays different software controlled buttons or graphic control representations. Software controlled buttons change their functionality depending on the mode of the device operation. Software controlled buttons are divided into two types: user programmable software controlled touch screen buttons and mode dedicated touch screen buttons. The touch screen 4 shows the display of items when the terminal is in the scan mode of operation. Reference numeral 3 designates a group of user programmable software controlled buttons F1 through F10. By programming the functionality of the buttons F1 through F10, a user can customize the display. Personal scan button 19, store scan button 12, add button 9, delete button 11, check button 2, log-in button 21, and log-out button 22 are mode dedicated touch screen buttons. They appear on the display whenever the terminal is in the scan mode of operation, and can not be changed by the user. Personal scan button 19 is utilized when the user wants to come out of a store scan operating mode and wants to enter the personal scan mode. Store scan button 12 is utilized when the user wants to come out of the personal scan mode and wants to enter the store scan mode. When either the personal scan mode or the store scan mode is enabled, the add button 9, the delete button 11 and the check button 2 appear on the touch screen. Selecting either one of the buttons activates scanning. Scanning may also be activated by the add, the delete, or the check voice commands into the microphone. The log-in button 21 is used to establish cellular communication channel between the terminal and a remote party during the self-checkout transaction. Establishment of the cellular communication channel is described in more detail in FIG. 6. The log-out button 22 is used to terminate the cellular communication channel between the terminal and the remote party at the end of the self-checkout transaction. Termination of the cellular communication channel is described in more detail in FIG. 9.

The cellular portable communications terminal 1 is designed to ease the aiming at a bar code symbol 10, when the user is attempting to scan the bar code. When scanning is activated by the add button 9, the delete button 11, the check button 2, or the voice commands, a laser beam 14 exits the terminal through a light transmitting window 13 and is reflected off of the bar code 10. The reflected light 15 is detected and processed by the circuitry inside the terminal.

The terminal uses an antenna 8 to communicate with the remote party via a cellular telephone network. When the device 1 is used as a cellular phone, the antenna 8 mostly transmits and receives voice data. When the device 1 is operated in the store scan mode, the antenna 8 transmits and receives bar code, voice and product data.

Figure 2:
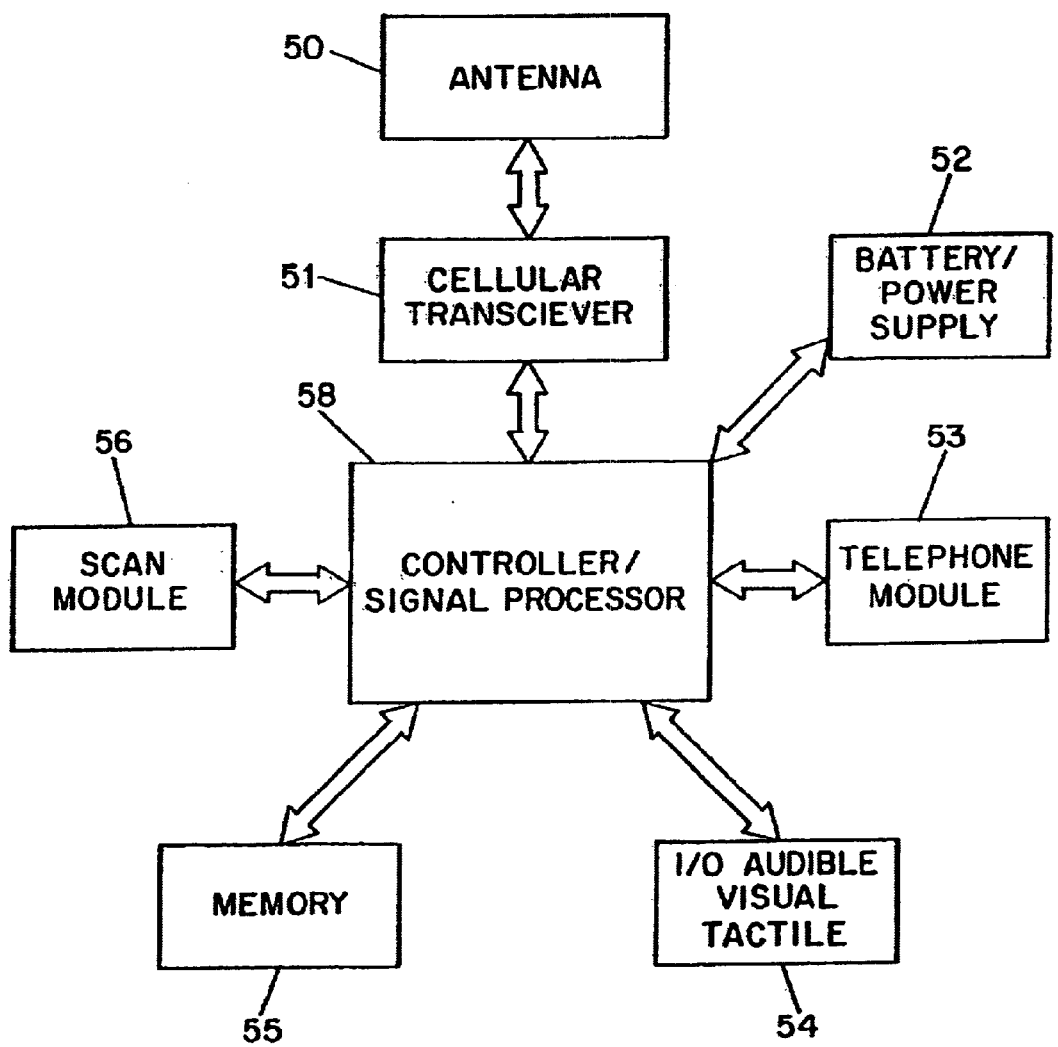
FIG. 2 is a block diagram of the portable communications terminal of FIG. 1.

FIG. 2 contains a block diagram of the portable communications terminal illustrated in FIG. 1. Battery/power supply 52 provides system's electrical power and recharge capability. It is comprised of a battery, a regulator, a charger, and a voltage detection circuit, as well known in the prior art. It may be an integral part of the terminal or a separate plug-in module.

Once the portable communications terminal has been powered up and depending upon the mode of operation, either a scan module 56 or a telephone module 53 interface with all the other system components through a controller/signal processor 58. The scan module 56 contains all the components required for scanning the bar codes and processing the received signals. It may be triggered by the add button, the delete button, or the voice commands into the microphone, as described in FIG. 1. The scan module 56 generates a scanning laser beam and detects the returning light reflected off of the bar code being scanned. The detected reflected light (FIG. 1, reference numeral 15) produces an electrical signal proportional to the light intensity. The scan module 56 processes the electrical signal to produce a digital signal, where the width of the pulses and spacings between the pulses correspond to the width of the bars and spacings between the bars in the actual bar code. Bar code scanning in this fashion is well known in the art.

In an alternative embodiment, the reference numeral 56.may represent a bar code reading charge-coupled-device ("CCD") module. Bar code reading CCDs are well known in the art.

The phone module 53 provides telephone-communication capabilities. It is powered up by the phone key described in FIG. 1. Once the module has been powered up, the portable communications terminal acts as a cellular phone. Cellular phones are well known in the art of cellular communication.

The controller/signal processor 58 acts as a central node of interface between every functional block. It processes signals from both, the telephone module 53 and the scan module 56. When the unit is operating as a scanning terminal, the digitized signal representing electrical equivalent of the bars and spaces in the real bar code, coming from the scan module 56, is decoded inside the controller/signal processor 58.

In an alternative embodiment, the scan module may not contain a digitizer, in which case the digitization of the analog signal and the decoding functions take place inside the controller/signal processor 58.

All the system parameters, portable communications terminal id number, programs and data reside in memory 55, which is comprised of any combination of RAMs, ROMs, EPROMs, and EEPROMs. Some data is saved into memory by the device manufacturer, or by a cellular network provider. Other data is saved into the device memory by a consumer. Portable communications terminal's identification number may be consumer's telephone number, or a different preassigned user identification number, which is stored inside the terminal's nonvolatile memory. It is used by the system for establishing the cellular communication channel during the self-checkout transaction, and may also be used during phone operation.

I/O block 54 represents different interface means between an operator and a portable communications terminal. This interface contains elements for processing audible, visual, or tactile inputs and outputs to and from an operator. As shown in FIG. 1, the interface may comprise a touch screen, the hard keys, a speaker and a microphone.

The cellular transceiver 51 transmits and receives RF signals from the cellular network via an antenna 50 (FIG. 1 reference numeral 8). The transceiver 51 uses cellular communication protocol, to transmit and receive information. The cellular communication protocols are well known in the art of cellular communications.

Figure 3:
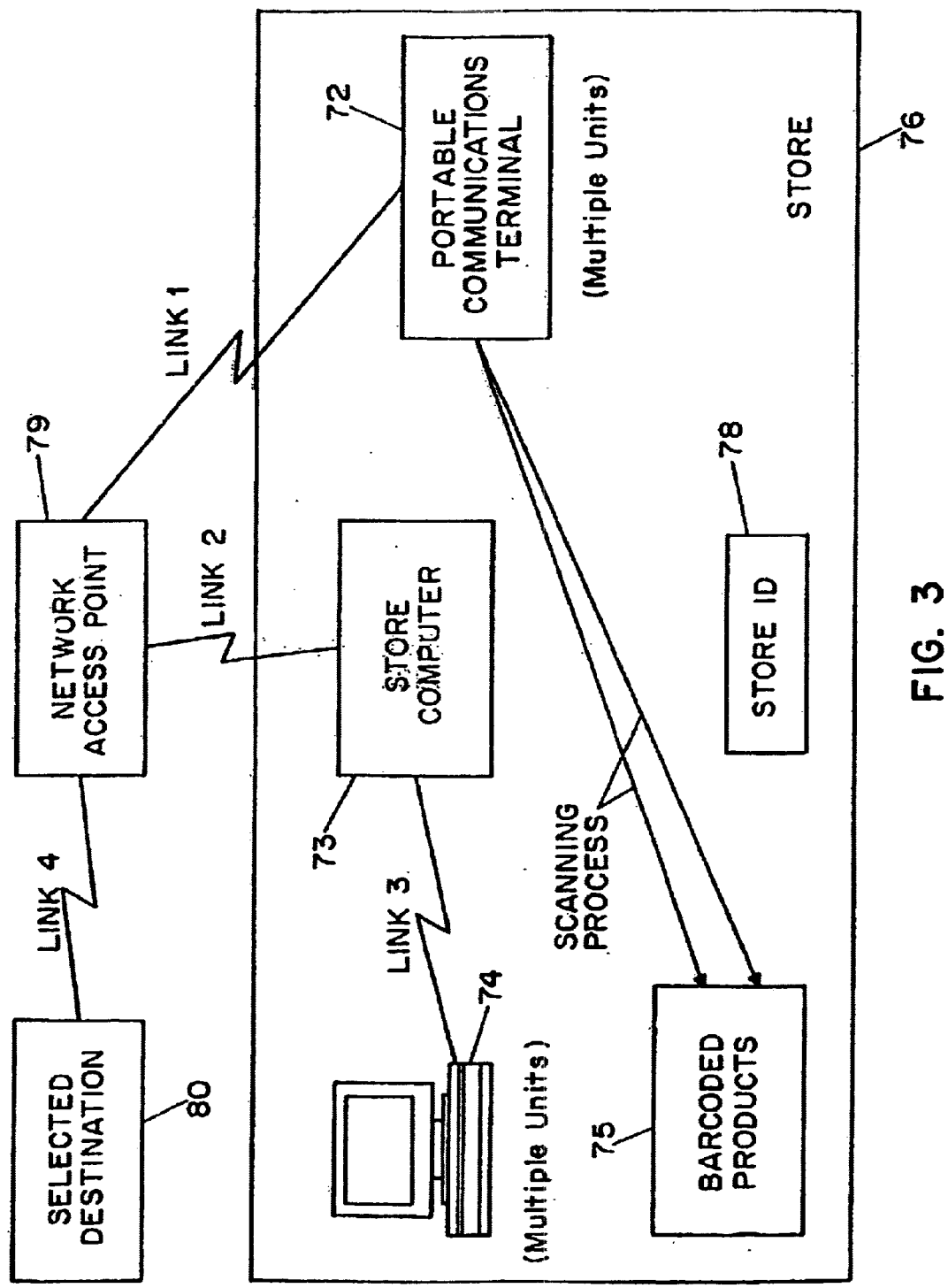
FIG. 3 is a block diagram of preferred embodiment of the self-checkout system and its associated communication links.

FIG. 3 illustrates the components of the invented self-checkout system. A store 76 is a retail establishment containing bar coded products 75, a store computer 73, and a number of checkout registers 74. Referenced by the numeral 78 is the store ID number. It represents the store's telephone number, or access code, which the customer has to access in order to establish communication with the store computer 73. The store computer 73 contains information about each bar coded product inside the store 76. This information includes price, pricing methods, expiration date, nutrition data, recipes, etc.

Consumer enters the store 76, with his own portable communications terminal 72. Upon entering the store 76 and turning on the terminal, the customer places the terminal into the store scan mode, described in FIG. 5, by selecting the scan key, followed by selection of the store scan button on the touch screen. Once the store scan mode has been activated, the user proceeds with the self-checkout transaction. During the self-checkout transaction there is communication between the portable communications terminal 72 (FIG. 1 reference numeral 1) and the store computer 73. The communication channel between the portable communications terminal 72 and the store computer 73 is established via link1, cellular access point 79 and link2. Link1 is a bi-directional cellular link between the cellular phone/scanner terminal 72 and a cellular access point 79. Cellular access point 79 re-transmits signals from the portable communications terminal 72 and the store computer 73 via cellular link1 and cellular link2. Link2 is a bi-directional link between the cellular access point 79 and the store computer 73. It may either be a cellular or a hardwired communications link. The checkout register 74 communicates with the store computer 73 via communication link3. Link3 may either be a cellular, an RF or a hardwired bi-directional communication link. This link is used by the system during register transaction described in FIG. 5, as part of the store scan mode.

When the customer uses the device as a cellular phone to call a selected destination 80, link2 is replaced by another bi-directional communication link, designated in FIG. 3 as link4. Link4 may either be a cellular or a hardwired communication link providing communication between the network access point 79 and the selected destination 80. In the phone mode, as well as in the scan operating mode, link1 remains cellular communication link.

Figure 4:
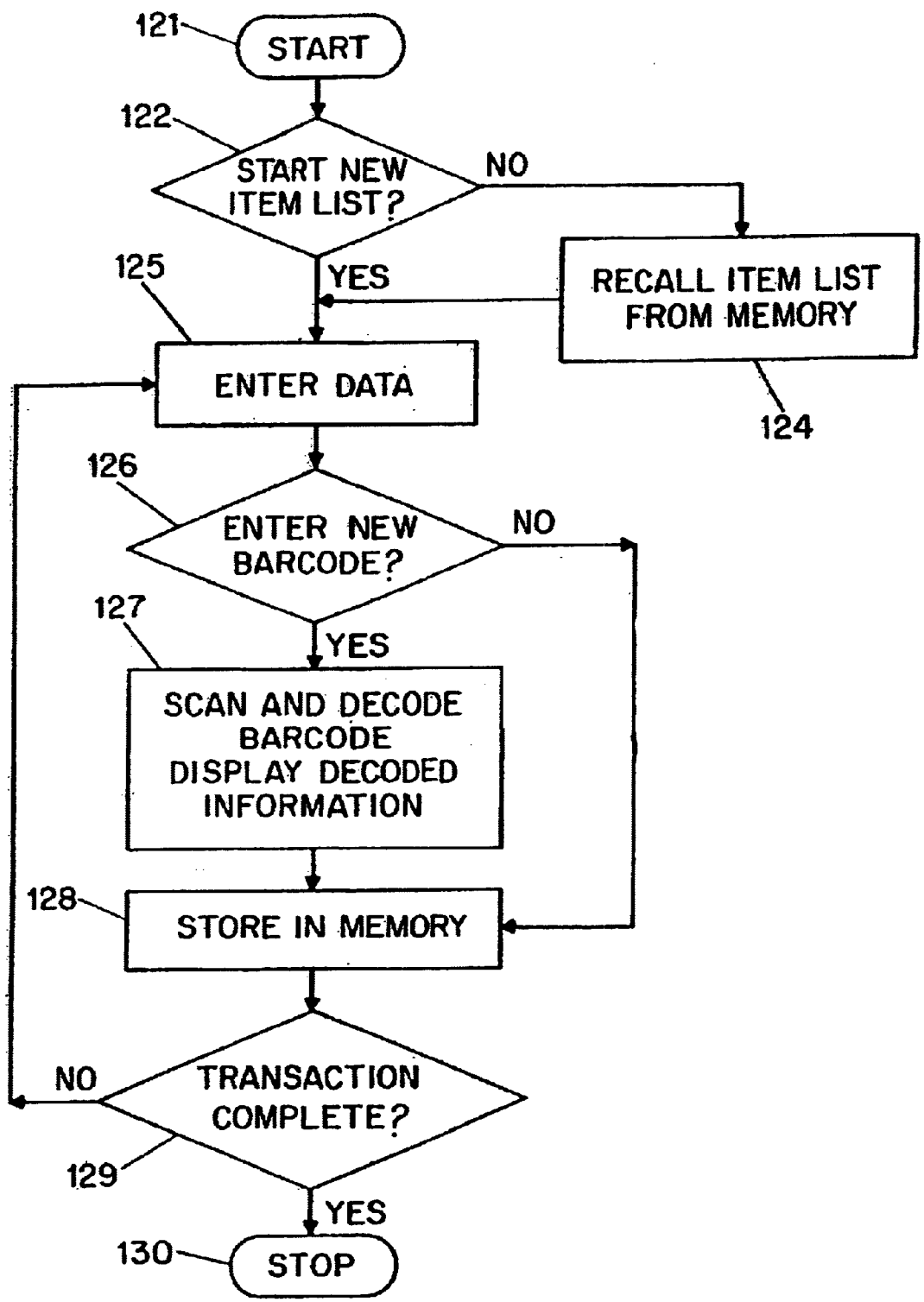
FIG. 4 is a flow chart of the personal scan mode of the portable communications terminal.

FIG. 4 illustrates simplified flowchart of the personal scan mode. In the personal scan mode the device functions as a hand-held portable scanning terminal with the cellular transceiver turned off. Portable scanning terminals are well known in the art of bar code scanning. Personal scan mode is used by the consumer to perform data entry and bar code scanning for personal and business purposes. In addition, the scanning function does not have to be utilized. The user may make personal lists of items and store them in the device's memory. This is accomplished by selecting the appropriate buttons on the terminal's touch screen. These lists may include different products, names, shopping lists, telephone numbers, etc. Data lists may be retrieved from memory at any time. Personal scan mode allows the user to scan bar codes. These bar codes may represent coupons for the items in the shopping lists, or the items themselves. Scanned bar coded information may be linked to any item list inside the device's memory. A user initiates the start 121 phase of the operation by pressing the scan key described in FIG. 1, and selecting the personal scan button on the device's touch screen. After entering personal scan mode, the user either creates a new file inside the device's memory, or retrieves for modification an existing memory file. This decision is represented by the condition test 122. If the result of the test was negative, the user wants to modify one of the existing files stored in memory, he selects that file from an existing file menu list. This is shown by the process block "recall item list from memory" 124. If the result of the decision test 122 was positive, a new user file is created. Enter data process 125 represents manual user input of data into the active file, either new or retrieved, via a touch screen. During condition test 126 the user decides if he wants to add any items to the list by scanning new bar codes. If the test result is positive, the system enters the "Scan and Decode Bar Code" process block 127. The user points to the bar code to be added to the active file and initiates scanning. After the new bar code has been scanned and decoded, or if the result of the condition test 126 was negative, the updated, new or retrieved active file is stored in the device's memory. This is represented by the "Store in Memory" process block 128. Condition 129 tests to determine if the personal scan mode operation has been completed. If the result of the condition test 129 is negative, the system goes back to the "Enter Data" process block 125, to allow the user to perform additional data entry into the active file. If the test result is positive, the system enters a stop state 130 and waits for more user input.

Figure 5:
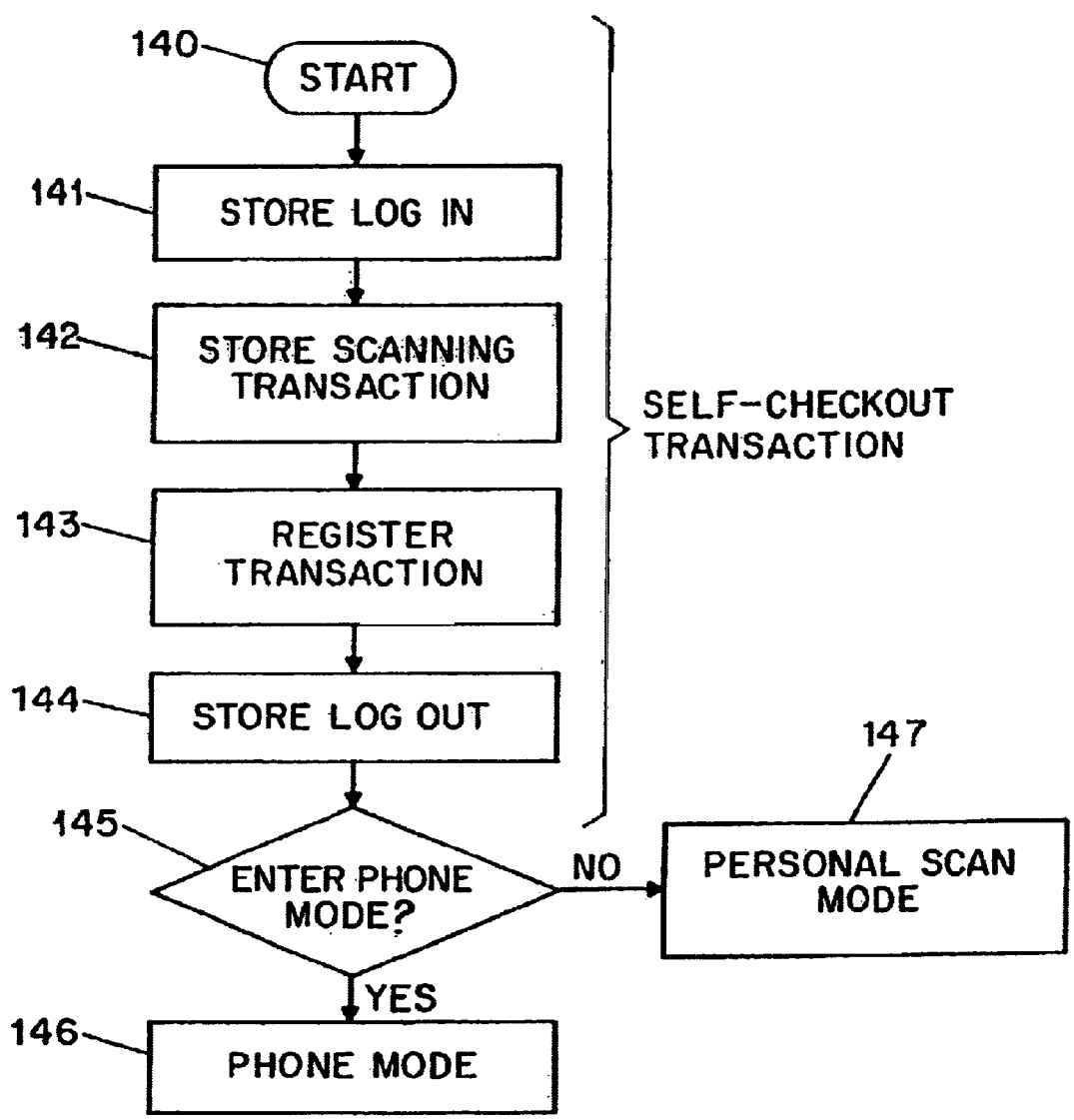
FIG. 5 is a flow chart of the store scan mode of the portable communications terminal.
Figure 6:
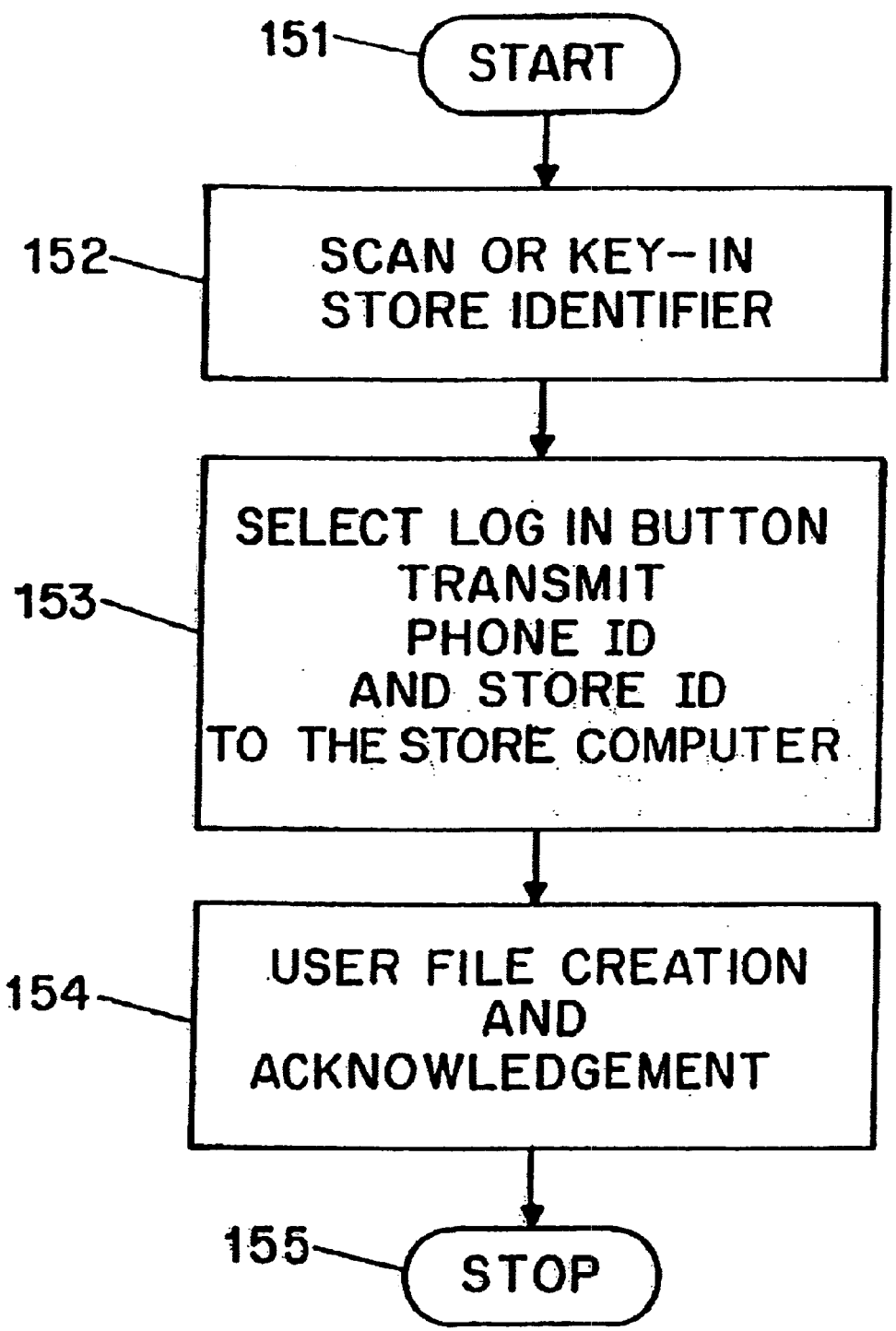
FIG. 6 is a flow chart of a store log-in process, which is a part of the store scan mode of the self-checkout transaction.

FIG. 5 illustrates a simplified flowchart of the store scan mode. The store scan mode is the primary mode for the self-checkout application. The user initiates start 140 phase of the store scan mode by pressing the scan key described in FIG. 1, and selecting the store scan button on the device's touch screen. After placing the device into the store scan mode the user initiates a store log-in process 141. The log-in process establishes communication channel between the portable communications terminal (FIG. 3, reference numeral 72) and the store computer (FIG. 3, reference numeral 73). Each customer sets up his own communications channel. During the log-in process a dedicated customer's transaction file gets created inside the store computer's memory. Details of the store log-in process are shown in FIG. 6. After the log-in process 141 has been completed, the store scanning transaction 142 is performed. During the store scanning transaction a customer selects his purchases, sends an item's bar code information to the store computer and in return receives the item's price and other information. The store scanning transaction is described in FIG. 7. After completion of the store scanning transaction 142, the system initiates the register transaction 143, during which the purchased items are verified by the cashier, the final bill is calculated and paid. The register transaction 143 is described in more detail in FIG. 8. After the register transaction 143 has been completed, the log-out process 144 is initiated by the user. During the log-out process, the established communication channel between the customer's portable communications terminal and the store computer is terminated. Log-out process is described in more detail in FIG. 9. At this point self-checkout transaction has been completed. Steps indicated by the reference numerals 140 through 144 define the self-checkout process. Next, based upon the user input, the condition test 145 determines whether the system should enter the phone mode or the personal scan mode. If the test result is positive, the system enters the phone mode 146 and the device starts acting as a cellular phone. If the test result is negative, the system enters the personal scan mode, described above in FIG. 4.

FIG. 6 represents a block diagram of a store log-in process which sets up the communications channel between the portable communications terminal (FIG. 3, reference numeral 72) and the store computer (FIG. 3, reference numeral 73.) The starting point of the store log-in process is represented by the start point 151. In order to establish a communications channel, a user keys in or scans a store ID number (FIG. 3, reference numeral 78.) This is represented by the process block 152. By selecting the log-in button on the touch screen, the user transmits the store identifier and the internal terminal identifier, to the store computer via a telephone network. This is represented by the process block 153. The store computer (FIG. 3, reference numeral 73) receives the transmission, creates a customer dedicated transaction file and sends the acknowledgment of the customer's presence, back to the portable communications terminal. The acknowledgment is provided by an audible signal and a visual indication on the touch screen. This step of the log-in process is represented by the process block, 154. Process Stop 155 signifies that the system has completed the log-in process.

Figure 7:
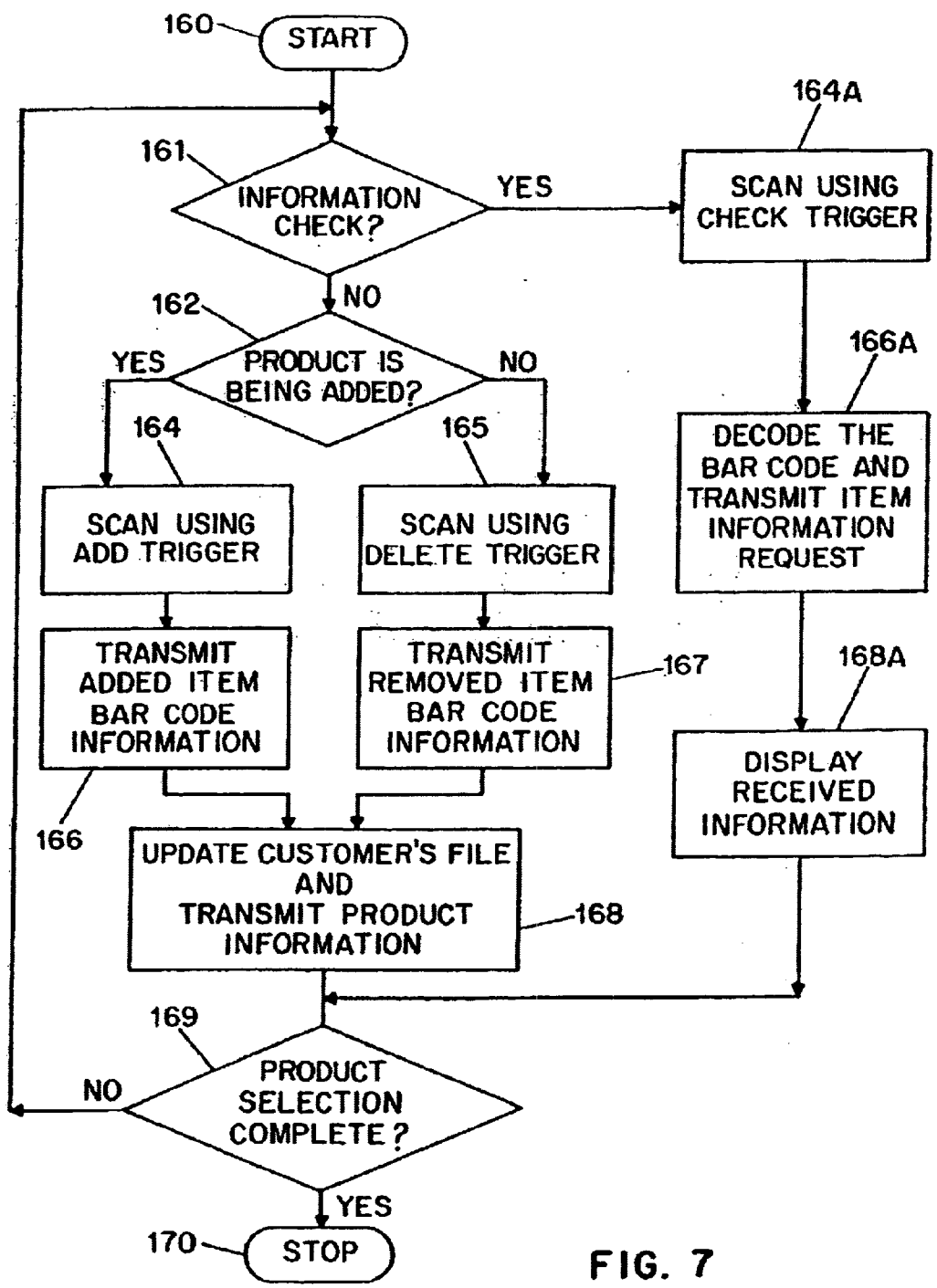
FIG. 7 is a flow chart of a store scanning transaction associated with the store scan mode of the self-checkout transaction.

After the log-in process has been completed, the customer proceeds with the store scanning transaction (FIG. 5, reference numeral 142). FIG. 7 represents the block diagram of the store scanning transaction, which is a part of the store scan mode. Start point 160 represents the beginning of the store scanning transaction. Decision test 161 determines if an item will be scanned just to get information about the item without effecting the customer's purchase list. If the result is positive, the customer just wants to get the item information, he proceeds to scan the item using the check trigger, as shown by the process block 164A. The portable communications terminal transmits the decoded product bar code information to the store computer as an item information request. This is shown by the process block 166A. The store computer retrieves the requested product information from its memory and sends the information back to the terminal. This is represented by the process block 168A. If the result of the decision test 161 is negative, the customer wants to modify his transaction file and the system conducts the decision test 162. Decision test 162 determines if an item scanned by the customer will be added to or deleted from the customer's purchased item list. If the test result is positive, the consumer wants to add the product to his purchases. If the test result is negative, the consumer wants to remove the product from his purchases. In order to add the product to the purchase list inside his transaction file, the customer initiates scanning and decoding of the product bar code using the add button (FIG. 1, reference numeral 9) on the touch screen. This is shown by the process block 164. In order to remove the product from the purchase list inside his transaction file, the customer initiates scanning and decoding of the product bar code using the delete button (FIG. 1, reference numeral 11) on the touch screen. This is shown by the process block 165. The portable communications terminal transmits the decoded product bar code information to the store computer. If the scanning was triggered by the add button, the product bar code information will be transmitted as an addition to the customer's transaction file. This is shown by the process block 166. If the scanning was triggered by the delete button, the product bar code information will be transmitted as an removal from the customer's transaction file. This is shown by the process block 167. The store computer updates the customer's transaction file by an addition or a removal of the item, and sends the scanned product information back to the user. This is represented by the process block 168. The transmission from the terminal to the store computer, represented by the process block 166, 166A or 167, and the response from the store computer represented by the process block 168 or 168A, may be accomplished in real-time. Decision test 169 follows processes represented by the blocks 168 and 168A. Decision test 169 determines whether the store scanning transaction will be repeated. If the customer did not complete his product selection or product information check, then the result of the test is negative, the system goes back to the decision block 161 and gets ready to scan another product bar code. If the result of the test is positive, it means that the customer completed his store scanning transaction and is ready to proceed to a checkout register in order to initiate the register transaction. This is shown by the Stop point 170.

Figure 8:
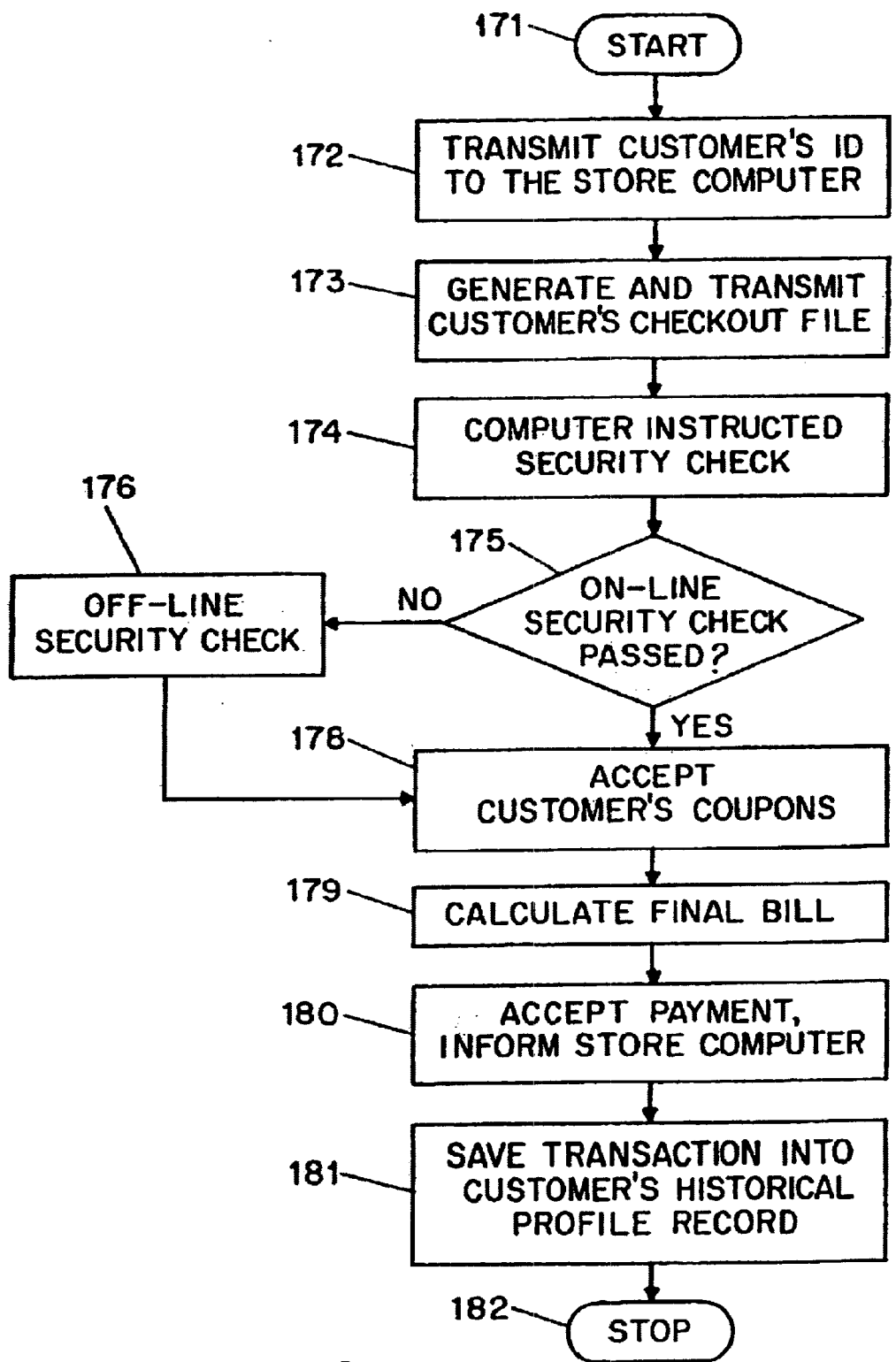
FIG. 8 is a flow chart of a register transaction associated with the store scan mode of the self-checkout transaction.

FIG. 8 shows a flow chart of the register transaction (FIG. 5, reference numeral 143). Register transaction is initiated when the customer approaches a checkout register (FIG. 3, reference numeral 74) or a pay station. This is indicated by the start point 171. The customer provides his portable communications terminal ID to a cashier. The cashier enters the portable communications terminal ID number into the register and transmits it to the store computer (FIG. 3, reference 73) via the communication link3. (FIG. 3, reference link3). Terminal ID entry may be accomplished via manual means, by optically reading the terminal's bar coded ID or using magnetic stripe reader. The transmission is a request to the store computer to provide the cashier with the customer's checkout file. The file will be comprised of item price, total price, and security verification measures. This is shown by the process block 172. The store computer generates customer checkout file by retrieving the customer's store transaction file, and appending to it any necessary security verification instructions. The customer's scanning transaction file includes all the price and product information about the scanned items. It may also include explanations of different promotional pricing methods the store may have. The security verification instructions are generated based upon the specific customer shopping list, the previous customer shopping history record, or the content of the present purchase. For example, if the customer wants to purchase a restricted item, such as alcohol or tobacco, he may have to show his personal ID card to the cashier. The customer checkout file gets transmitted back to the cashier via link3, shown in FIG. 3. This is represented by the process block 173. The cashier receives the customer's checkout file and performs the instructed on-line security check. This is shown by the process block 174. Condition test 175 deals with the result of the on-line security check performed by the cashier. If the on-line security check has passed, then the cashier proceeds to accept any coupons the customer might have. This is shown by the process block 178. If the on-line security check has failed, then the customer must undergo an off-line security check. During the off-line security check, a specified sample of purchased items is scanned and verified. At the end of the off-line security check, the total purchase price is calculated. This is shown by the process block 176. The cashier then starts accepting customer's coupons, as shown by the process block 178. After all the coupons have been accepted and entered into the system, the final bill is calculated. This is shown by the process block 179. Block 180 represents the process during which the cashier accepts the customer's payment and records it into the store computer via link3. As shown by the process block 181, the store computer receives the payment information and saves the customer's checkout file into the customer's historical profile record. This historical profile record will be used in conjunction with other data to generate future security measures during customer's future self-checkout transactions. Stop point 182 represents the end of the register transaction.

Figure 9:
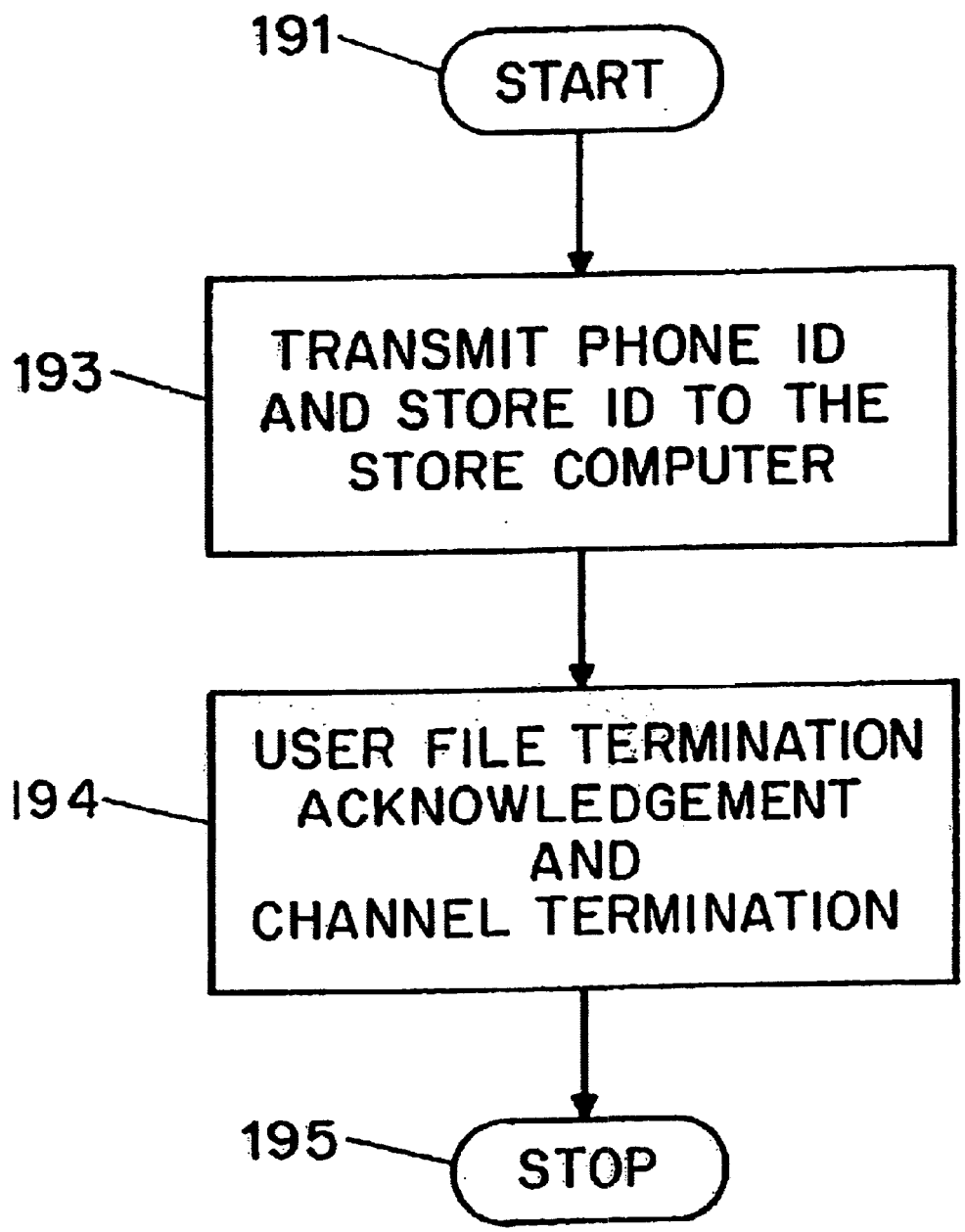
FIG. 9 is a flow chart of a store log-out process, which is a part of the store scan mode of the self-checkout transaction.

After the register transaction has been completed, the store log-out process is initiated by the user. FIG. 9 represents a flow chart of the store log-out process (FIG. 5, reference numeral 144), which terminates the communication channel between the portable communications terminal (FIG. 3, reference numeral 72) and the store computer (FIG. 3, reference numeral 73). The starting point of the store log-out process is represented by the start point 191. By selecting the log-out button on the touch screen, the user transmits the store identifier and the internal terminal identifier, to the store computer. This step is represented by the process block 193. The store computer (FIG. 3, reference numeral 76) receives the transmission, deletes the customer's transaction file, sends the file termination acknowledgment back to the customer, and terminates the communication channel. This step of the log-out procedure is represented by the process block 194. Process step 195 signifies that at this point the system has completed the log-out process. An audible signal and a visual indication on the touch screen provide the acknowledgment of channel termination. After the particular communication channel between the store computer and the cellular scanning terminal is terminated, it becomes available for use to other customers.

The embodiment described above represents a new and unique system. The self-checkout transaction described above may be carried on by a number of customers within the same store and at the same time. The link between the store computer and the checkout register may be other than cellular. Also, multiple stores may utilize a single store computer to communicate with customers shopping inside the different stores.

Figure 10:
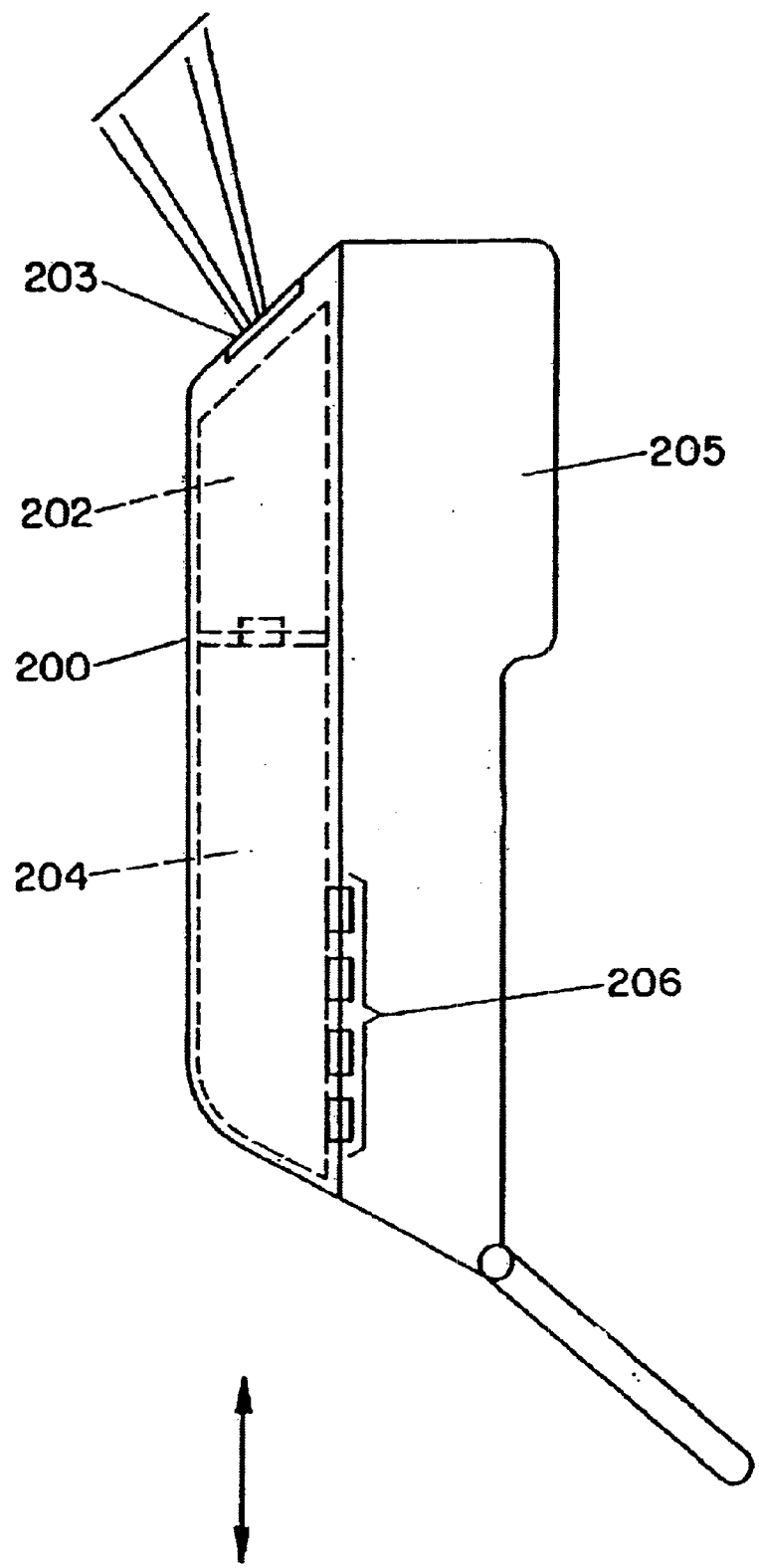
FIG. 10 illustrates a portable communications terminal with an insertable battery pack module, wherein the battery pack module contains an integrated bar code reading module in accordance with the alternative embodiment of the present invention.

As shown in FIG. 10, an alternate embodiment comprises a cellular phone 205, having a replaceable, rechargeable power supply module (battery pack) 200, with a bar code scanning module, 202, built into the battery pack. Reference numeral 203 represents an optical window through which a laser beam generated inside the scanning module exits the battery pack. Reference numeral 204 represents the battery location inside the battery pack 200. Reference numeral 206 represents a plurality of electrical interface means which provide power to the cellular phone, and enable communications between the bar code scanning module and the cellular phone. The bar code scanning module is built into the battery pack in such a way that the manual handling of the cellular phone does not interfere with the laser beam coming out of the scanning module. When the cellular phone is in the scan operating mode, the phone's visual and audible user interface enables the communication with the scanning module. The device, 205, provides full compatibility with other battery packs which do not have the built in bar code scanning module.

In another alternative embodiment, the portable communications terminal has an additional operating mode called a suspend mode, which allows the user to temporarily interrupt the self-checkout transaction and return to the personal scanning mode or the phone mode. This may occur when the customer, while in the middle of selecting his purchases, wants to make a phone call to a selected destination, or the battery pack has discharged below a predetermined level. In order to suspend the transaction, the user, via the selection of an appropriate touch screen button or a terminal key, sends the suspend mode request to the store computer. The store computer then places the user's transaction file into a temporary memory space. Next, the store computer creates a "suspend transaction" record containing the terminal's (user's) ID number and the memory address of the suspended transaction file. The record is stored into the "suspend transaction" table, containing a plurality of the "suspend transaction" records. The computer sends a suspend mode initiation acknowledgment back to the user and terminates the communications channel. The user's transaction file remains in the temporary memory until the user re-starts the self-checkout transaction or until a predetermined time period has elapsed. If the predetermined time duration has elapsed, the user's suspend mode is terminated and the user's transaction file, together with the corresponding "suspend transaction" record, is deleted from the computer memory. If the user re-starts the self-checkout transaction within the allowed time period, then the user's transaction file is transferred back into the active memory space inside the store computer. The user re-starts the self-checkout transaction by repeating the log in procedure described in FIG. 6, except that the generation of a new transaction file is replaced by the retrieval of the suspended transaction file. The self-checkout transaction may also be suspended by the host computer when the communication channel is being interrupted. The interruptions may be caused by the loss of signal strength due to an obstruction in the cellular transmission path, or a discharge of the terminal's battery pack. When transaction is being suspended due to a signal power loss, the host computer also sends a channel suspension signal to the terminal. The terminal, upon receipt of the channel suspend signal notifies the user of the condition.

Other variations of the preferred embodiment are possible within the spirit of the invention. For example, the customer's transaction file, rather than being located inside the store computer, could be located inside the portable communications terminal. The file is updated by the transmissions from the store computer. During the register transaction the transaction file is downloaded to the checkout register directly form the portable communication terminal via any standard communication means.

Also, the number of hard keys could be greater then the number presently shown in the preferred embodiment.

Figure 11:
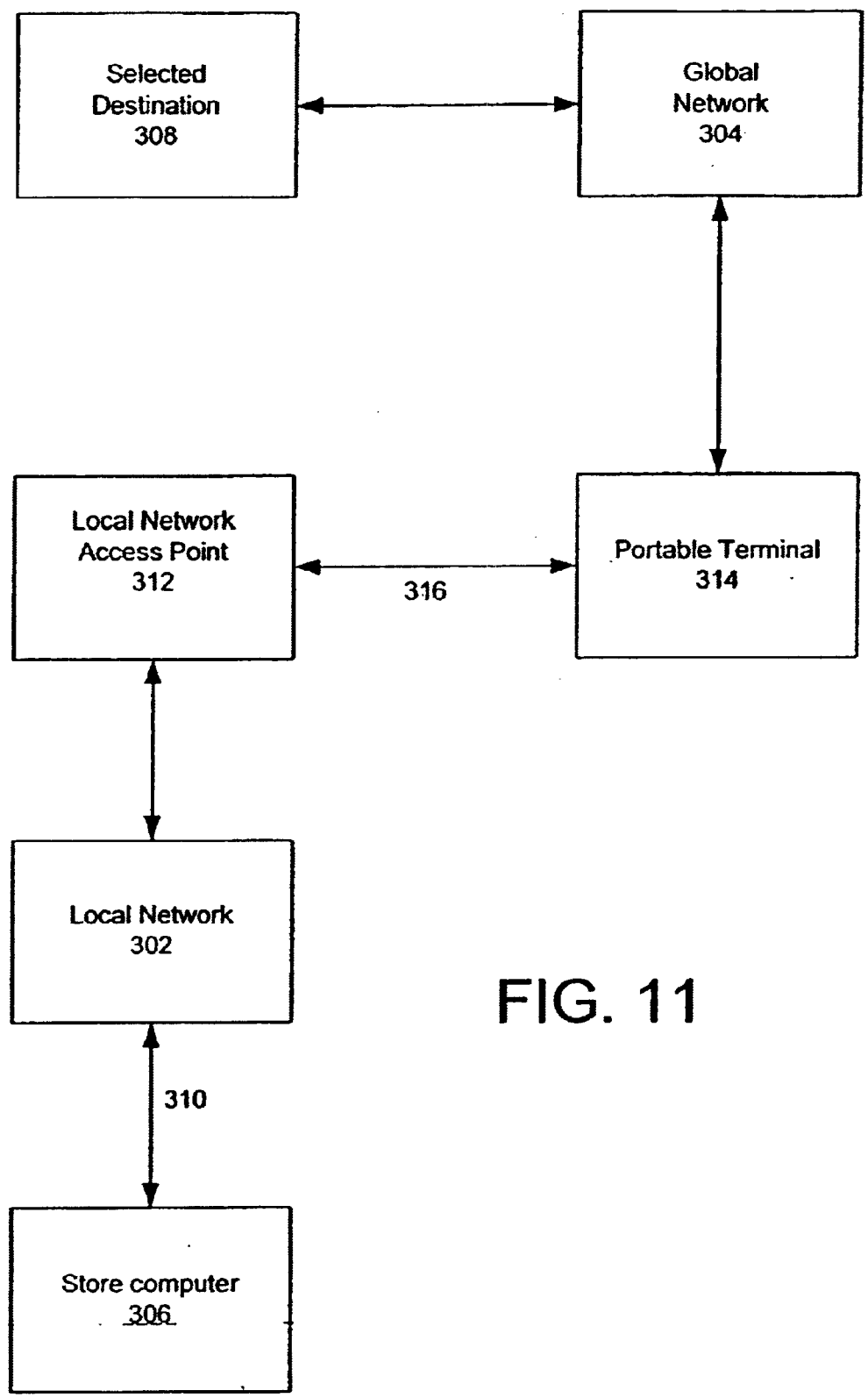
FIG. 11 is a block diagram of a alternative embodiment of the self-checkout system and associated communication links.

Another embodiment, shown in FIG. 11, uses two telephone networks: a local network 302, such as a local telephone network, and a global network 304, such as a global telephone network. The local network is used to communicate with the store computer 306 during a self-checkout transaction. The global network 304 is used to communicate with a selected destination 308 during a cellular phone operation. The link 310 between the local network and the store computer may either be cellular or hardwired. The local network requires a dedicated local network access point 312 which acts as a transceiver for communicating with the portable terminal 314. The portable terminal 314 gains access to the local telephone network 302 via a cellular link 316 between the terminal 314 and the local access node 312. Once the local channel between the portable terminal and the store computer has been established, all the other self-checkout functions are performed the same way as the ones in the preferred embodiment. Because the local network access point 312 will usually be located in close proximity to the retail establishment in which the self-checkout transaction takes place, the portable terminal cellular transmission path of this embodiment is shorter than the corresponding transmission path of the preferred embodiment. Because of the shorter transmission distance, the terminal transmitter could reduce its power during a self-checkout transaction, which in turn would extend the terminal's continuous on time or could be used to create differential rate costs for terminal usage.

What is claimed by the invention is:

1. A portable handheld voice terminal, comprising:
    a radio transceiver for (a) transmitting data to and receiving data from a location external of the terminal via a local network and for (b) transmitting data to and receiving data from a location external of the terminal via a global network;
    a subsystem including a microphone and speaker for receiving voice signals from the microphone and applying voice signals to the speaker;
    a display for displaying data to a user;
    a keypad for applying data to the subsystem;
    a controller for controlling the operation of the transceiver, to transmit and receive voice data alternatively over the local network and the global network.

2. The terminal according to claim 1, further comprising a bar code scanner for providing data representative of a read bar code to the controller.

3. The terminal according to claim 1, wherein the local network is used to communicate with a store computer during a self-checkout transaction and the global telephone is used to communicate with a selected destination during a telephone operation.

4. A portable handheld wireless terminal comprising:
    a radio transceiver for transmitting data to and receiving data from a location external of the terminal via a plurality of wireless networks;
    a subsystem including a microphone and speaker for receiving voice signals from the microphone and applying voice signals to the speaker;
    a display for displaying data to a user; and
    a controller for controlling the operation of the transceiver, subsystem and display to transmit and receive voice data alternatively over selected ones of the plurality of networks.

5. The terminal according to claim 4, further comprising a bar code scanner for providing data representative of a read bar code to the controller.

6. The terminal according to claim 4, wherein a first wireless network is used to communicate with a store computer during a self-checkout transaction and a second wireless network is used to communicate with a selected destination during a telephone operation.

7. A portable handheld wireless terminal comprising:
    a radio transceiver for transmitting data to and receiving data from a location external of the terminal via a plurality of wireless networks;
    a subsystem including a microphone and speaker for receiving voice signals from the microphone and applying voice signals to the speaker;
    a display for displaying data to a user; and
    a controller for controlling the operation of the transceiver, subsystem and display to transmit and receive voice data alternatively over selected ones of the plurality of networks wherein the controller selects a power level for the transceiver based upon the particular network the terminal is in communication with.

* * * * *